United States Patent
Jin et al.

(10) Patent No.: US 12,299,324 B2
(45) Date of Patent: May 13, 2025

(54) STORAGE DEVICE, METHOD OF OPERATING THE SAME, AND COMPUTING SYSTEM INCLUDING THE STORAGE DEVICE

(71) Applicant: SK hynix Inc., Icheon-si (KR)

(72) Inventors: Byoung Min Jin, Icheon-si (KR); Min Gu Kang, Icheon-si (KR); Ku Ik Kwon, Icheon-si (KR); Gyu Yeul Hong, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/420,536

(22) Filed: Jan. 23, 2024

(65) Prior Publication Data

US 2025/0060903 A1  Feb. 20, 2025

(30) Foreign Application Priority Data

Aug. 14, 2023 (KR) .................. 10-2023-0106225

(51) Int. Cl.
*G06F 3/06* (2006.01)
(52) U.S. Cl.
CPC .......... *G06F 3/0658* (2013.01); *G06F 3/0607* (2013.01); *G06F 3/0671* (2013.01)
(58) Field of Classification Search
CPC ..... G06F 3/06; G06F 9/45545; G06F 9/45558
See application file for complete search history.

(56) References Cited

U.S. PATENT DOCUMENTS

| | | | | |
|---|---|---|---|---|
| 11,847,350 | B2* | 12/2023 | Kanno | G06F 3/0608 |
| 2020/0042246 | A1* | 2/2020 | Maharana | G06F 3/0626 |
| 2020/0278808 | A1* | 9/2020 | Zhu | G06F 3/0659 |
| 2021/0019085 | A1* | 1/2021 | Zhu | G06F 13/4282 |
| 2022/0276887 | A1 | 9/2022 | Bert | |

FOREIGN PATENT DOCUMENTS

KR  20090050382 A  5/2009

* cited by examiner

*Primary Examiner* — Khoa D Doan
(74) *Attorney, Agent, or Firm* — Perkins Cole LLP

(57) ABSTRACT

Storage devices, methods of operating storage devices, and computing systems including storage devices are disclosed. In an embodiment, a storage device may include a plurality of memory devices and a memory controller for controlling the plurality of memory devices to process a request of a host in accessing plurality of memory devices, wherein the memory controller is configured to allocate the plurality of memory devices to a plurality of functions, allocate a plurality of request slots allowed to process the request per unit time for each of the plurality of functions, determine idle request slots other than active request slots being used to process the request among the plurality of request slots allocated to each of the plurality of functions, and control an internal operation of the plurality of memory devices based on at least one target function including the idle request slots among the plurality of functions.

17 Claims, 12 Drawing Sheets

STORAGE DEVICE, METHOD OF OPERATING THE SAME, AND COMPUTING SYSTEM INCLUDING THE STORAGE DEVICE

CROSS-REFERENCE TO RELATED APPLICATION

This patent document claims priority to and benefits of the Korean patent application number 10-2023-0106225, filed on Aug. 14, 2023, which is incorporated herein by reference in its entirety.

TECHNICAL FIELD

Various embodiments of the disclosed technology generally relate to a semiconductor device, and more particularly to a storage device for controlling internal operations occurring inside the storage device, a method of operating the storage device, and a computing system including the storage device.

BACKGROUND

A storage device may be any type of computing hardware that is used for storing or extracting data files and objects.

Examples of the storage device may include a multi-function storage device that can allocate memory spaces to a plurality of functions so that each function can independently access the allocated memory spaces. Such a storage device needs to minimize an influence of an operation controlled by one function on an operation controlled by another function. Furthermore, when an operation corresponding to a request of a host is performed simultaneously with an internal operation such as garbage collection, read reclaim, and wear leveling, resources of the storage device need to be efficiently used.

SUMMARY

Various embodiments of the disclosed technology relate to a storage device with enhanced operation performance with respect to each function in a multi-function environment, a method of operating the storage device, and a computing system including the storage device.

In an embodiment of the disclosed technology, a storage device may include a plurality of memory devices, and a memory controller in communication with the plurality of memory devices to control the plurality of memory devices in processing to deal with a request of a host device that is in communication with the storage device to access data stored in the plurality of memory devices, wherein the memory controller is configured to allocate the plurality of memory devices to a plurality of functions, allocate a plurality of request slots corresponding to at least part of the plurality of memory devices available for dealing with the request of the host device per unit time to each of the plurality of functions, determine idle request slots other than active request slots that are being used for processing the request of the host device, among the plurality of request slots allocated to each of the plurality of functions, and control an internal operation of the plurality of memory devices based on at least one target function associated with the idle request slots, among the plurality of functions.

In an embodiment of the disclosed technology, a storage device may include a memory device including a plurality of memory areas, and a memory controller in communication with the plurality of memory devices to control the memory device in processing a request of a host device in accessing the plurality of memory devices, wherein the memory controller is configured to allocate the plurality of memory areas to a plurality of functions, allocate a plurality of request slots corresponding to at least part of the plurality of memory areas available for dealing with the request of the host device per unit time to each of the plurality of functions, determine idle request slots other than active request slots that are being used to process the request of the host device among the plurality of request slots allocated to each of the plurality of functions, and control an internal operation of the memory device based on at least one target function associated with the idle request slots, among the plurality of functions.

In an embodiment of the disclosed technology, a method of operating a storage device may include allocating a plurality of request slots corresponding to at least part of memory resources in the storage device, to a plurality of functions, receiving a request of a host device, allocating the received request to the plurality of request slots allocated to a function of the plurality of functions corresponding to the received request, performing a host-requested operation corresponding to the received request based on active request slots allocated the received request, detecting a condition for performing an internal operation, and performing the internal operation based on at least one target function associated with idle request slots to which the received request is not allocated, among the plurality of request slots.

In an embodiment of the disclosed technology, a computing system may include a storage device including a plurality of memory areas to store data, and an external control device including a plurality of virtual machines allocated to the plurality of memory areas, each virtual machine providing the storage device with a request to control an allocated memory area among the plurality of memory areas, wherein the storage device is configured to allocate a plurality of reference resources for each of the plurality of memory areas, perform an operation corresponding to the request based on first resources among the plurality of reference resources, and perform an internal operation of the storage device based on remaining second resources other than the first resources among the plurality of reference resources.

The storage device may determine a number of the plurality of reference resources allocated to each of the plurality of memory areas depending on a size ratio of each of the plurality of memory areas.

The storage device may reduce a number of the second resources in response to a decrease in a performance value of an operation corresponding to the request performed in the plurality of memory areas while the internal operation is performed.

The storage device may determine whether there is the decrease in the performance value of the operation corresponding to the request performed in the plurality of memory areas by comparing a reference performance value corresponding to the first resources with a performance value corresponding to the first resources while the internal operation is performed.

The storage device may perform the internal operation by using the reduced number of second resources.

In an embodiment of the disclosed technology, a computing system may include a plurality of storage devices, and a controller configured to transmit a request to the plurality of storage devices to control the plurality of storage devices, wherein the controller is configured to allocate the plurality of storage devices to a plurality of functions, allocate a plurality of request slots corresponding to at least part of the plurality of storage devices available for dealing with the request per unit time for each of the plurality of functions, determine idle request slots other than active request slots that are being used to process the request among the plurality of request slots allocated to each of the plurality of functions, and control an internal operation of the plurality of storage devices based on at least one target function including the idle request slots among the plurality of functions.

The controller may determine a number of the plurality of request slots allocated to each of the plurality of functions according to a performance value of each of the plurality of functions.

The controller may control the plurality of storage devices to perform an operation corresponding to the request by using the active request slots.

The controller may control the plurality of storage devices to perform the internal operation by using the idle request slots of the at least one target function.

The controller may determine a size of the internal operation according to a number of the idle request slots of the at least one target function, and control the internal operation corresponding to the determined size.

DETAILED DESCRIPTION

Specific structural features or functions for certain embodiments disclosed in this patent document are examples only to illustrate certain implementations of the disclosed technology.

Figure 1:
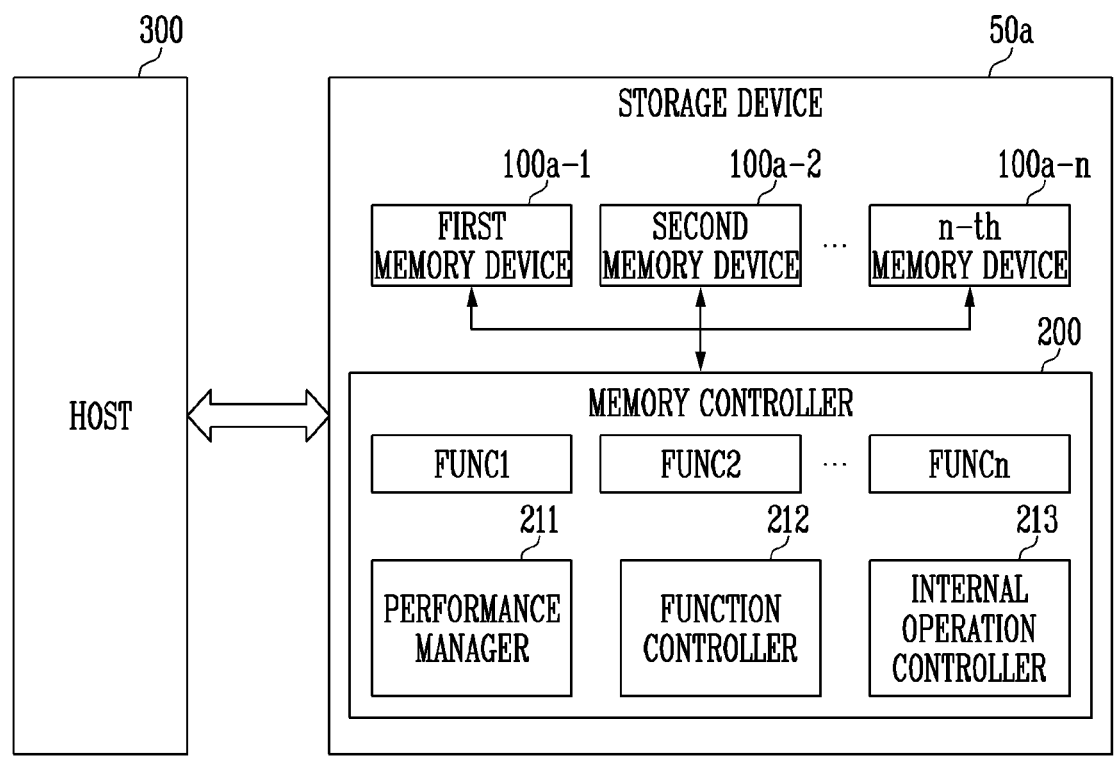
FIG. 1 is a diagram illustrating an example of a storage device based on an embodiment of the disclosed technology.

FIG. 1 is a diagram illustrating an example of a storage device based on an embodiment of the disclosed technology.

Referring to FIG. 1, a storage device 50a may include a plurality of memory devices 100a-1 to 100a-n, and a memory controller 200 for controlling operations of the plurality of memory devices 100a-1 to 100a-n. The storage device 50a may be a device for storing data. A host device 300 may be in communication with the storage device 50a to write data into and to retrieve data from the storage device 50a. In some implementations, the storage device 50a may be under the control of the host (or host device) 300. The host device 50a may be implemented in various forms depending on specific applications associated with the storage device 50a, such as a mobile phone, a smartphone, an MP3 player, a laptop computer, a desktop computer, a game console, a television (TV), a tablet personal computer (PC) or an in-vehicle infotainment system.

Examples of the storage device 50a may include various types of storage devices or various types of memory packages. The type of the storage device 50a may vary depending on a host interface between the host 300 and the storage device 50a.

The plurality of memory devices 100a-1 to 100a-n may include a memory cell array (not illustrated) including a plurality of memory cells for storing data. The memory cell array may include a plurality of memory blocks. Each memory block may include a plurality of memory cells. One memory block may include a plurality of pages.

The plurality of memory devices 100a-1 to 100a-n may be configured to receive a command and an address from the memory controller 200 and access an area of the memory cell array selected by the address. The plurality of memory devices 100a-1 to 100a-n may perform, in response to a command, a write operation (program operation), a read operation or an erase operation on an area selected based on the address.

The memory controller 200 may control general operations of the storage device 50a.

In response to a request of the host 300 for accessing the storage device 50a, the memory controller 200 may control the plurality of memory devices 100a-1 to 100a-n within the storage device 50a to perform a host-requested operation corresponding to the request from the host 300. The host-requested operation may include, for example, program operations, read operations, erase operations or others. The memory controller 200 may provide a command to indicate the host-requested operation, a physical block address or data to the plurality of memory devices 100a-1 to 100a-n.

In an embodiment of the disclosed technology, the memory controller 200 may be connected to the plurality of memory devices 100a-1 to 100a-n through a plurality of channels. For example, the memory controller 200 may provide the command and the address to the plurality of memory devices 100a-1 to 100a-n through the plurality of channels to control program operations, read operations, and erase operations that are performed on the plurality of memory devices 100a-1 to 100a-n.

In an embodiment of the disclosed technology, in order for the memory controller 200 to control the plurality of memory devices 100a-1 to 100a-n, an interleaving scheme can be used to enhance operation performance. The interleaving scheme may be a scheme for controlling operations of at least two memory devices that overlap each other. In one example, the interleaving scheme may indicate a scheme that spreads memory addresses evenly across the storage device 50a.

In an embodiment of the disclosed technology, the memory controller 200 may include a plurality of functions FUNC1 to FUNCn, a performance manager 211, a function controller 212 and an internal operation controller 213. In an embodiment of the disclosed technology, the performance manager 211, the function controller 212 and the internal operation controller 213 may be implemented in hardware, software or a combination of the hardware and the software. For example, the performance manager 211, the function controller 212 and the internal operation controller 213 may be circuits or processors operating according to an algorithm, or processors executing codes. In some implementations, the plurality of functions FUNC1 to FUNCn may include physical functions provided by multiple physical function memory devices.

In some implementations, each of the plurality of functions FUNC1 to FUNCn may access an allocated memory or memory area separately. In some embodiments of the disclosed technology, the term "function" may be used to indicate a physical function (PF). In some embodiments of the disclosed technology, each of the plurality of functions FUNC1 to FUNCn may be configured using a driver that can be logically distinguished in the storage device 50a and performed in an independent operation unit.

In an embodiment of the disclosed technology, the plurality of functions FUNC1 to FUNCn may be allocated to the plurality of memory devices 100a-1 to 100a-n. For example, each of the plurality of functions FUNC1 to FUNCn may be allocated to a different memory device of the plurality of memory devices 100a-1 to 100a-n. Each function may control operations of the allocated memory device.

The performance manager 211 may activate or inactivate the plurality of functions FUNC1 to FUNCn according to a setting of the host 300.

In an embodiment of the disclosed technology, the performance manager 211 may divide a performance value of the storage device 50a into a plurality of request slots. The plurality of request slots may be allocated to the plurality of functions FUNC1 to FUNCn. In some implementations, the term "request slot" may be used to indicate a memory resource that can be allocated to functions FUNC1 to FUNCn.

In an embodiment of the disclosed technology, the performance value may include at least one of read bandwidth, write bandwidth, read speed, or write speed. The read bandwidth may refer to an input/output bandwidth during a read operation, and the write bandwidth may refer to an input/output bandwidth during a write operation. The read speed may refer to an input/output speed per second during the read operation, and the write speed may refer to an input/output speed per second during the write operation. In the meantime, the performance value may refer to a maximum performance value of each memory device.

In an embodiment of the disclosed technology, the request slot may be a unit of a request of the host 300 that can be handled per unit time. For example, the request slot is a unit that has a certain size corresponding to a portion of the performance value. In an embodiment, the request slot may be referred to as a "credit." In one example, the request slot may indicate a memory area (or memory space) or a memory device of the storage device 50a that is allocated to a certain function.

The function controller 212 may control the plurality of functions FUNC1 to FUNCn.

In an embodiment of the disclosed technology, the function controller 212 may instruct each of the plurality of functions FUNC1 to FUNCn to control operations of an allocated memory device based on allocated request slots. For example, each of the plurality of functions FUNC1 to FUNCn may control an allocated memory device to perform a host-requested operation based on a plurality of request slots.

In an embodiment of the disclosed technology, request slots being used to process, handle, or otherwise deal with, a request of the host 300 for accessing the memory devices 100a-1 to 100a-n among the plurality of request slots may be referred to as active request slots.

The internal operation controller 213 may control internal operations (e.g., internal operations of the storage device 50a) that are being performed.

In an embodiment of the disclosed technology, when detecting a condition corresponding to an internal operation, the internal operation controller 213 may generate a command, an address and data by itself regardless of the request from the host 300, and transmit the command, the address and the data to the plurality of memory devices 100a-1 to 100a-n. In an embodiment of the disclosed technology, the internal operation may include a wear leveling operation, a read reclaim operation, a garbage collection operation, etc.

In an embodiment of the disclosed technology, the internal operation controller 213 may control the internal operation based on remaining idle request slots other than active request slots that are being used by the host-requested operation among the plurality of request slots. In an embodiment of the disclosed technology, the idle request slot may refer to a request slot that is not being used to process or deal with the request of the host 300.

For example, the internal operation controller 213 may control an internal operation of the plurality of memory devices 100a-1 to 100a-n based on at least one target function including the idle request slots among the plurality of functions FUNC1 to FUNCn.

In an embodiment of the disclosed technology, the internal operation may be performed on at least one of the plurality of memory devices 100a-1 to 100a-n. The internal operation controller 213 may control the internal operation for a memory device that satisfies the condition of the internal operation.

The host 300 may communicate with the storage device 50a by using at least one of various communication schemes such as a universal serial bus (USB), serial AT attachment (SATA), a serial attached small computer system interface (SCSI) (SAS), a high speed interchip (HSIC), an SCSI, peripheral component interconnection (PCI), PCI express (PCIe), nonvolatile memory express (NVMe), a universal flash storage (UFS), secure digital (SD), a multimedia card (MMC), an embedded MMC (eMMC), a dual in-line memory module (DIMM), a registered DIMM (RDIMM), a load reduced DIMM (LRDIMM), etc.

Figure 2:
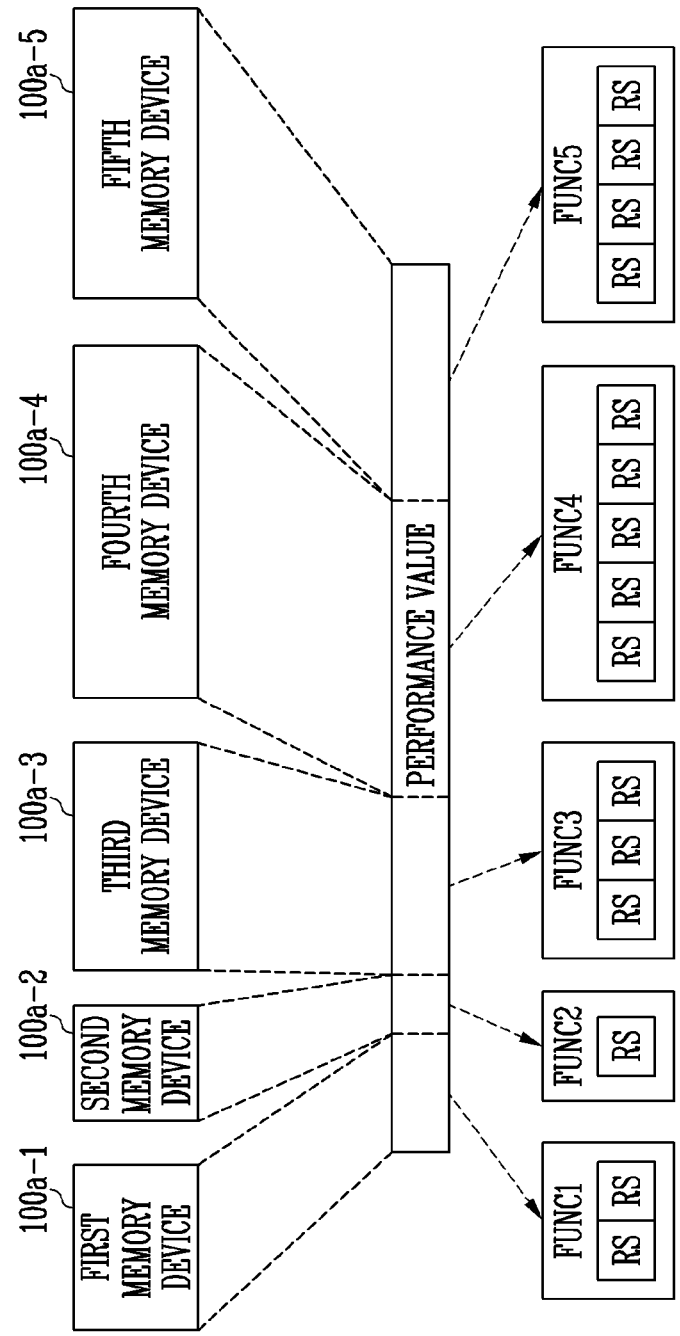
FIG. 2 is a diagram illustrating an example in which a plurality of request slots is allocated to a plurality of functions based on an embodiment of the disclosed technology.

FIG. 2 is a diagram illustrating an example in which a plurality of request slots is allocated to a plurality of functions based on an embodiment of the disclosed technology. Although FIG. 2 shows five functions FUNC1 to FUNC5 by way of example, the disclosed technology is not limited thereto.

Referring to FIG. 2, the performance manager 211 may determine request slots (RSs) allocated to each of the plurality of functions FUNC1 to FUNC5 among a plurality of RSs depending on a size ratio of memory areas included in a memory device allocated to each of the plurality of functions FUNC1 to FUNC5.

In an embodiment of the disclosed technology, the plurality of functions FUNC1 to FUNC5 may be allocated to the plurality of memory devices 100a-1 to 100a-5. For example, the first function FUNC1 may be allocated to the first memory device 100a-1, the second function FUNC2 to the second memory device 100a-2, the third function FUNC3 to the third memory device 100a-3, the fourth function FUNC4 to the fourth memory device 100a-4, and the fifth function FUNC5 to the fifth memory device 100a-5.

The performance manager 211 may divide the performance value into 5 request slot (RS) groups depending on a size ratio of memory areas included in each of the plurality of memory devices 100a-1 to 100a-5. The number of RSs included in each RS group may be proportional to the size of memory areas included in each memory device.

In some implementations, each of the plurality of functions FUNC1 to FUNC5 may be allocated with a number of RSs proportional to the size of the memory areas included in each allocated memory device.

In an embodiment of the disclosed technology, the number of the plurality of RSs allocated to each of the plurality of functions FUNC1 to FUNC5 may be determined according to a performance value of each of the plurality of functions FUNC1 to FUNC5. In this case, the performance value of each function FUNC1 to FUNC5 may be proportional to the size of the memory areas allocated to each function FUNC1 to FUNC5. The performance value may refer to a maximum performance value.

In some implementations, unlike the example illustrated in FIG. 2, the number of RSs allocated to each function may vary.

Figure 3:
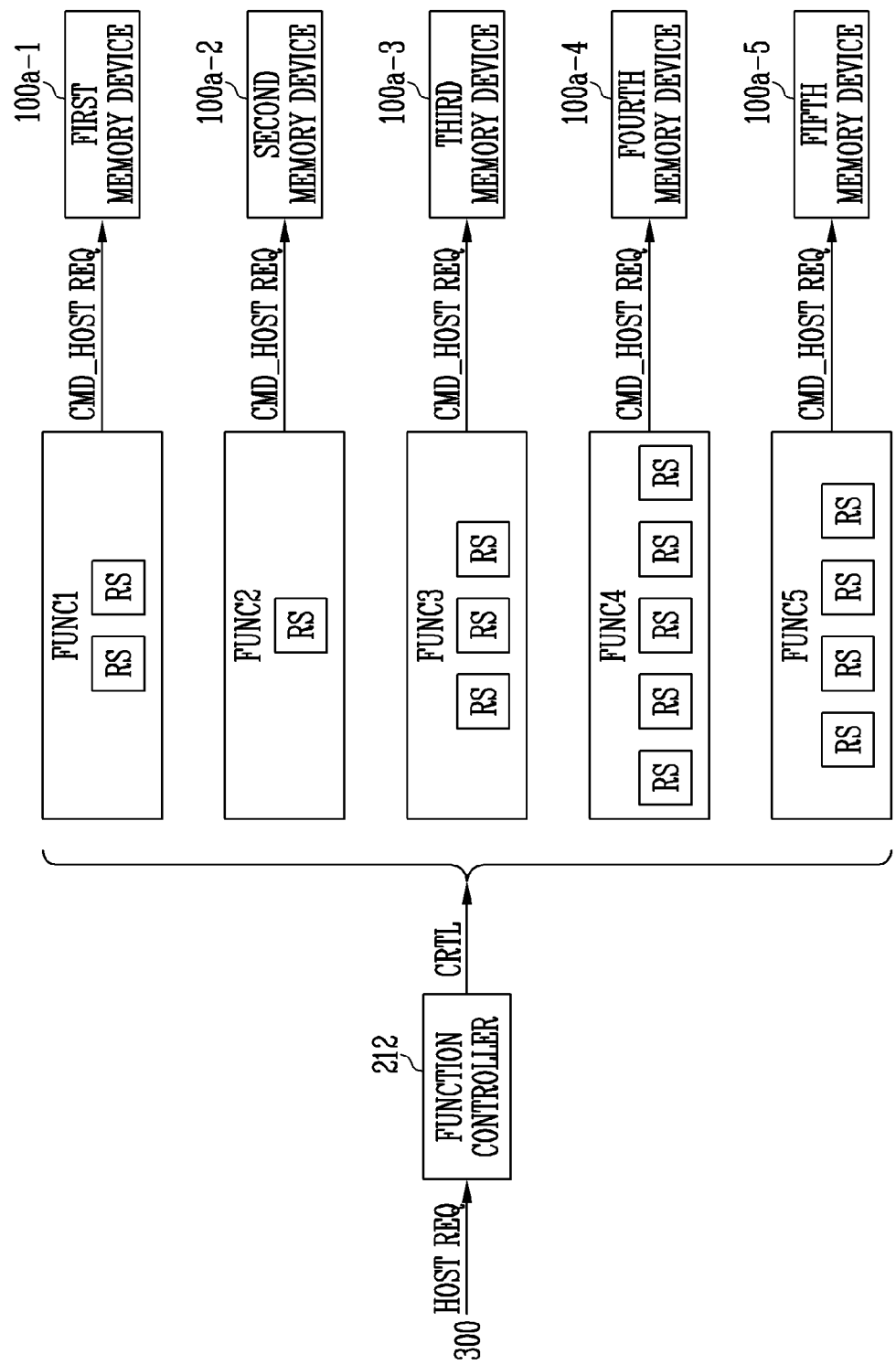
FIG. 3 is a diagram illustrating an example in which a plurality of functions controls a host-requested operation based on an embodiment of the disclosed technology.

FIG. 3 is a diagram illustrating an example in which a plurality of functions controls a host-requested operation based on an embodiment of the disclosed technology.

Referring to FIG. 3, the function controller 212 may provide a control signal CRTL to the plurality of functions FUNC1 to FUNC5 to control a host-requested operation in response to a request HOST REQ of the host 300.

In some implementations, each of the plurality of functions FUNC1 to FUNC5 may control an allocated memory device to perform the host-requested operation by using allocated RSs. For example, the first function FUNC1 may control the first memory device 100a-1 to perform the host-requested operation by using allocated 2 RSs. The two RSs may correspond to active RSs. The first memory device 100a-1 may perform the host-requested operation under the control of the first function. The other functions FUNC2 to FUNC5 may operate in the same manner as the first function FUNC1.

Figure 4:
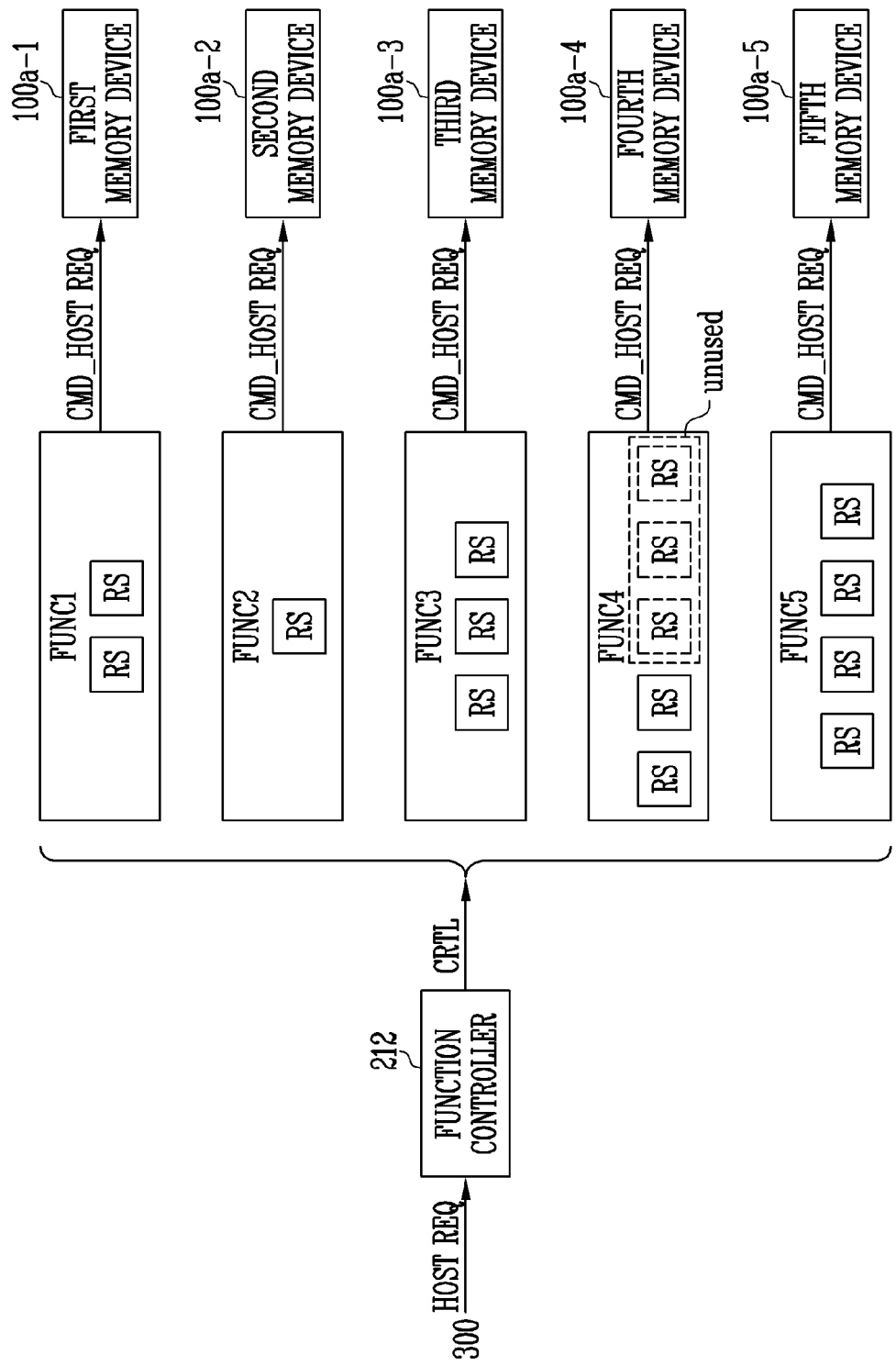
FIG. 4 is a diagram illustrating an example in which a plurality of functions controls a host-requested operation based on an embodiment of the disclosed technology.

FIG. 4 is a diagram illustrating an example in which a plurality of functions controls a host-requested operation based on an embodiment of the disclosed technology.

Referring to FIG. 4, each of the plurality of functions FUNC1 to FUNC5 may determine the number of active RSs among RSs allocated to the function, based on the number of received requests. For example, in a case that the fourth function FUNC4 may receive two requests from the host, the fourth function FUNC4 may determine that two RSs out of five RSs are active RSs and the other three RSs are idle RSs.

Furthermore, each of the plurality of functions FUNC1 to FUNC5 may use the active RSs to control an allocated memory device to perform the host-requested operation. For example, the fourth function FUNC4 may control the host-requested operation by using the allocated two RSs.

In an embodiment of the disclosed technology, each of the plurality of functions FUNC1 to FUNC5 may determine the number of the active request RSs among RSs allocated to the function, based on a performance value used for the host-requested operation.

Figure 5:
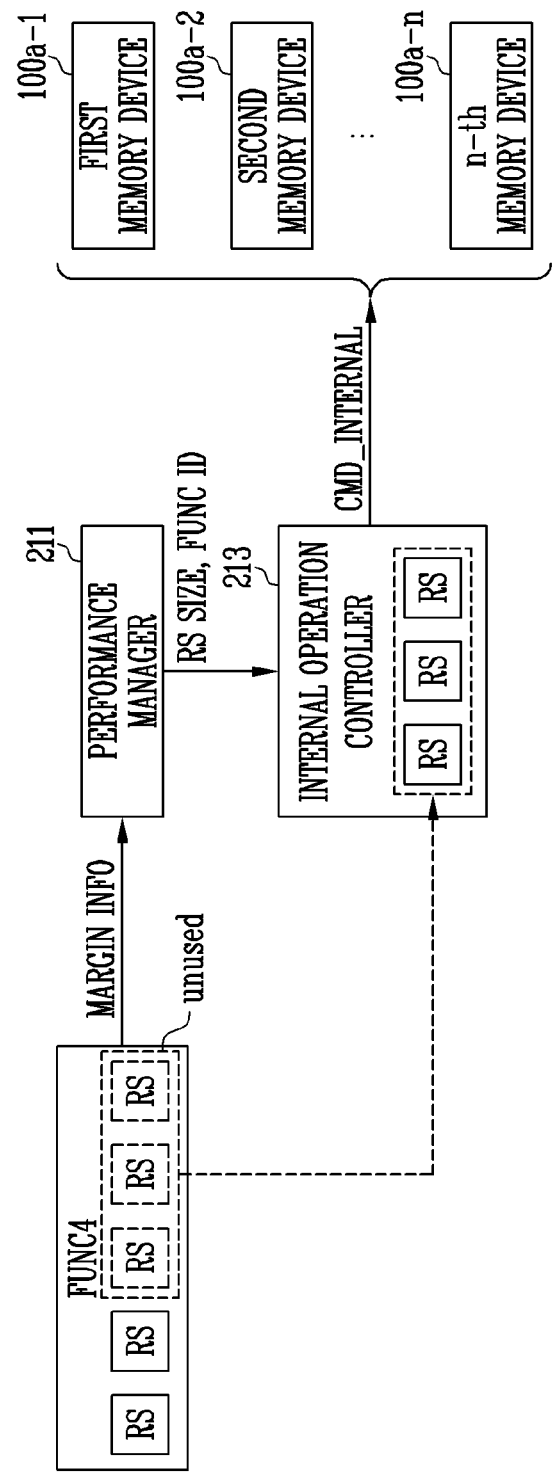
FIG. 5 is a diagram illustrating an example in which an internal operation is controlled based on an embodiment of the disclosed technology.

FIG. 5 is a diagram illustrating an example in which an internal operation is controlled based on an embodiment of the disclosed technology.

Referring to FIG. 5, the performance manager 211 may periodically check usage status of RSs allocated to the plurality of functions FUNC1 to FUNC5. For example, the performance manager 211 may receive information MARGIN INFO about the idle RSs from the fourth function FUNC4.

In an embodiment of the disclosed technology, when there are idle RSs, the internal operation controller 213 may use at least one target function associated with idle RSs, among the plurality of functions FUNC1 to FUNC5, to perform an internal operation using the plurality of memory devices 100a1 to 100a-5. In this case, the internal operation controller 213 may control or adjust the internal operation, for example, determine the size of the internal operation (e.g., resources allocated to the internal operation) according to the number of idle RSs and control the internal operation corresponding to the determined size of the internal operation.

For example, the performance manager 211 may provide the number RS SIZE of idle RSs and identification information FUNC ID of the target function allocated idle RSs to the internal operation controller 213, based on the information MARGIN INFO about the idle RSs.

The internal operation controller 213 may identify the fact that there are three idle RSs in the fourth function FUNC4, which is the target function, based on the identification information FUNC ID of the target function. The internal operation controller 213 may determine the size of the internal operation according to a performance value corresponding to the three idle RSs. The internal operation controller 213 may generate a command CMD_INTERNAL to instruct an internal operation corresponding to the determined size to be performed by the target function, and provide the command CMD_INTERNAL to the plurality of memory devices 100a1 to 100a-5.

Figure 6:
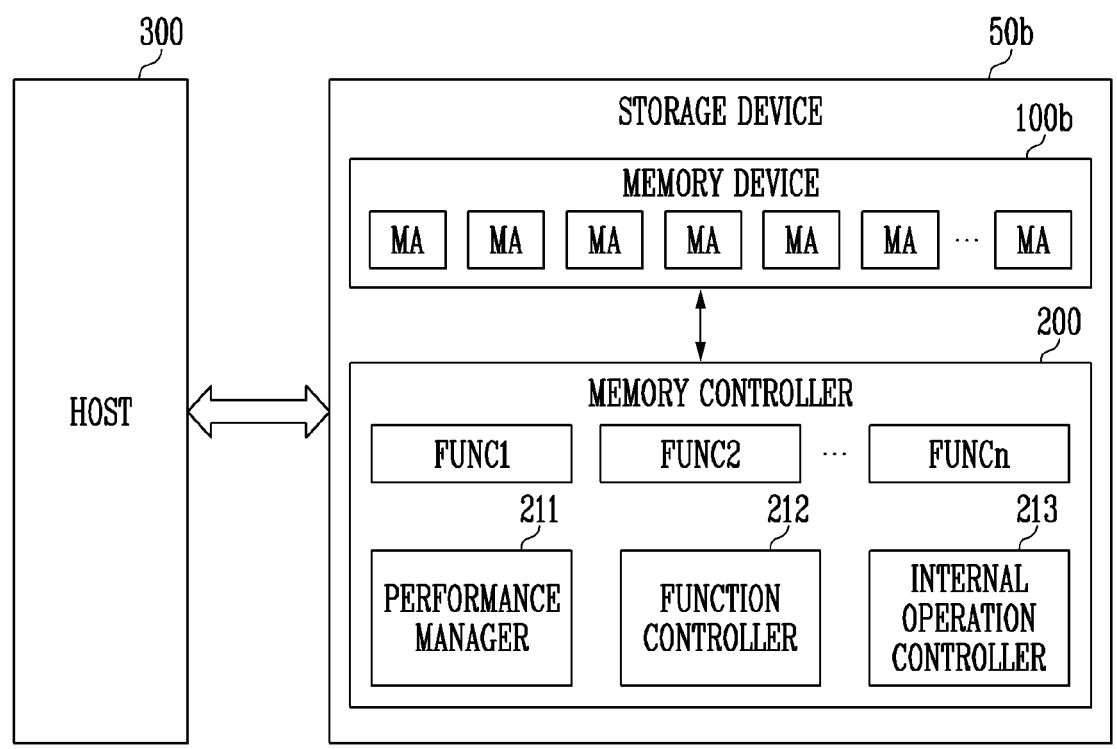
FIG. 6 is a diagram illustrating an example of a storage device based on an embodiment of the disclosed technology.

FIG. 6 is a diagram illustrating an example of a storage device based on an embodiment of the disclosed technology.

A storage device 50b as illustrated in FIG. 6 may include one memory device 100b unlike the storage device 50a illustrated in FIG. 1. Structures or operations of the plurality of memory devices 100a-1 to 100a-n and the memory controller 200 as described above in connection with FIG. 1 may be equally applied to the memory device 100b and the memory controller 200, respectively.

Referring to FIG. 6, the memory device 100b may include a plurality of memory areas (MAs). In an embodiment of the disclosed technology, the memory controller 200 may be connected to the memory device 100b through one channel.

The plurality of functions FUNC1 to FUNCn may be allocated to the plurality of MAs. The plurality of functions FUNC1 to FUNCn may control allocated MAs to perform a host-requested operation based on a plurality of RSs corresponding to divided performance values divided from the performance value of the storage device 50b.

The internal operation controller 213 may control the internal operation based on remaining idle RSs other than active RSs among the plurality of RSs.

For example, the internal operation controller 213 may control the internal operation of the memory device 100b based on at least one target function including the idle RSs among the plurality of functions FUNC1 to FUNCn.

Figure 7:
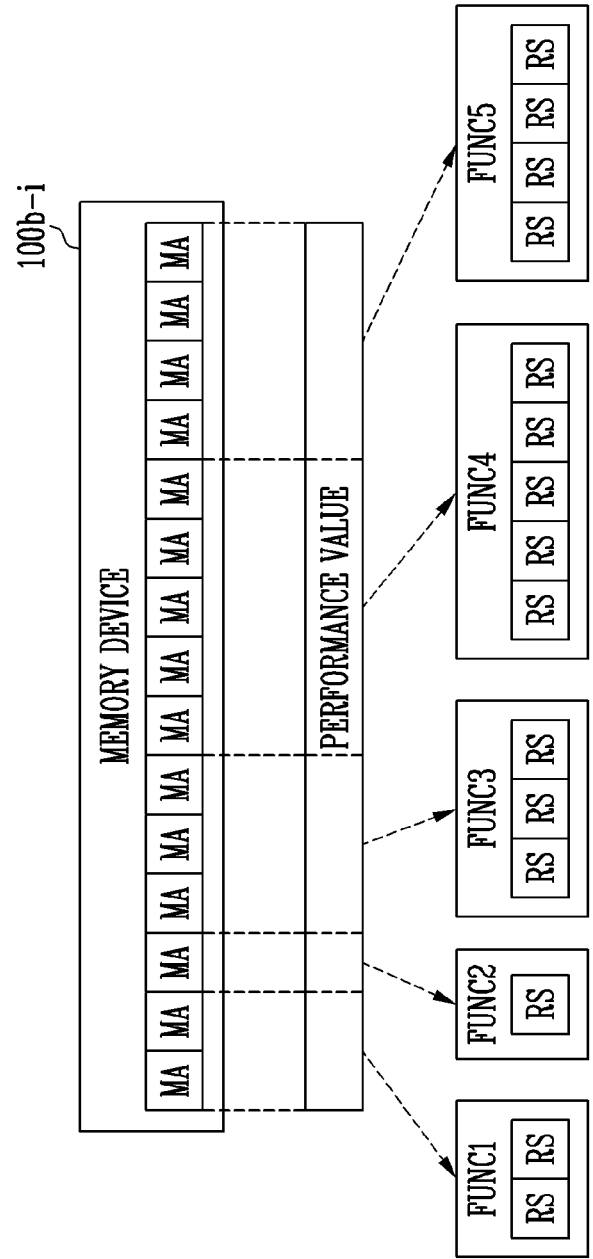
FIG. 7 is a diagram illustrating an example in which a plurality of request slots is allocated to a plurality of functions based on an embodiment of the disclosed technology.

FIG. 7 is a diagram illustrating an example in which a plurality of request slots (RSs) is allocated to a plurality of functions based on an embodiment of the disclosed technology.

Referring to FIG. 7, the performance manager 211 may determine RSs allocated to each of the plurality of functions FUNC1 to FUNCn among a plurality of RSs depending on a size ratio of MAs allocated to each of the plurality of functions FUNC1 to FUNC5.

In an embodiment of the disclosed technology, the number of the plurality of RSs allocated to each of the plurality of functions FUNC1 to FUNC5 may be determined according to a performance value of each of the plurality of functions FUNC1 to FUNC5. In this case, the performance value of each function FUNC1 to FUNC5 may be proportional to the size of the MAs allocated to each function FUNC1 to FUNC5.

In an embodiment of the disclosed technology, each of the plurality of functions FUNC1 to FUNC5 may be allocated to one or more MAs. For example, the first function FUNC1 may be allocated to two MAs, the second function FUNC2 to one MA, the third function FUNC3 to three MAs, the fourth function FUNC4 to five MAs, and the fifth function FUNC5 to four MAs.

The performance manager 211 may divide the performance value into 5 RS groups depending on the size ratio of the MAs allocated to each function. The number of RSs included in each RS group may be proportional to the size of MAs allocated to each function.

In some implementations, each of the plurality of functions FUNC1 to FUNC5 may be allocated a number of RSs proportional to the size of the allocated MAs.

In some implementations, unlike the example illustrated in FIG. 2, the number of MAs and the number of RSs allocated to each function may vary.

Figure 8:
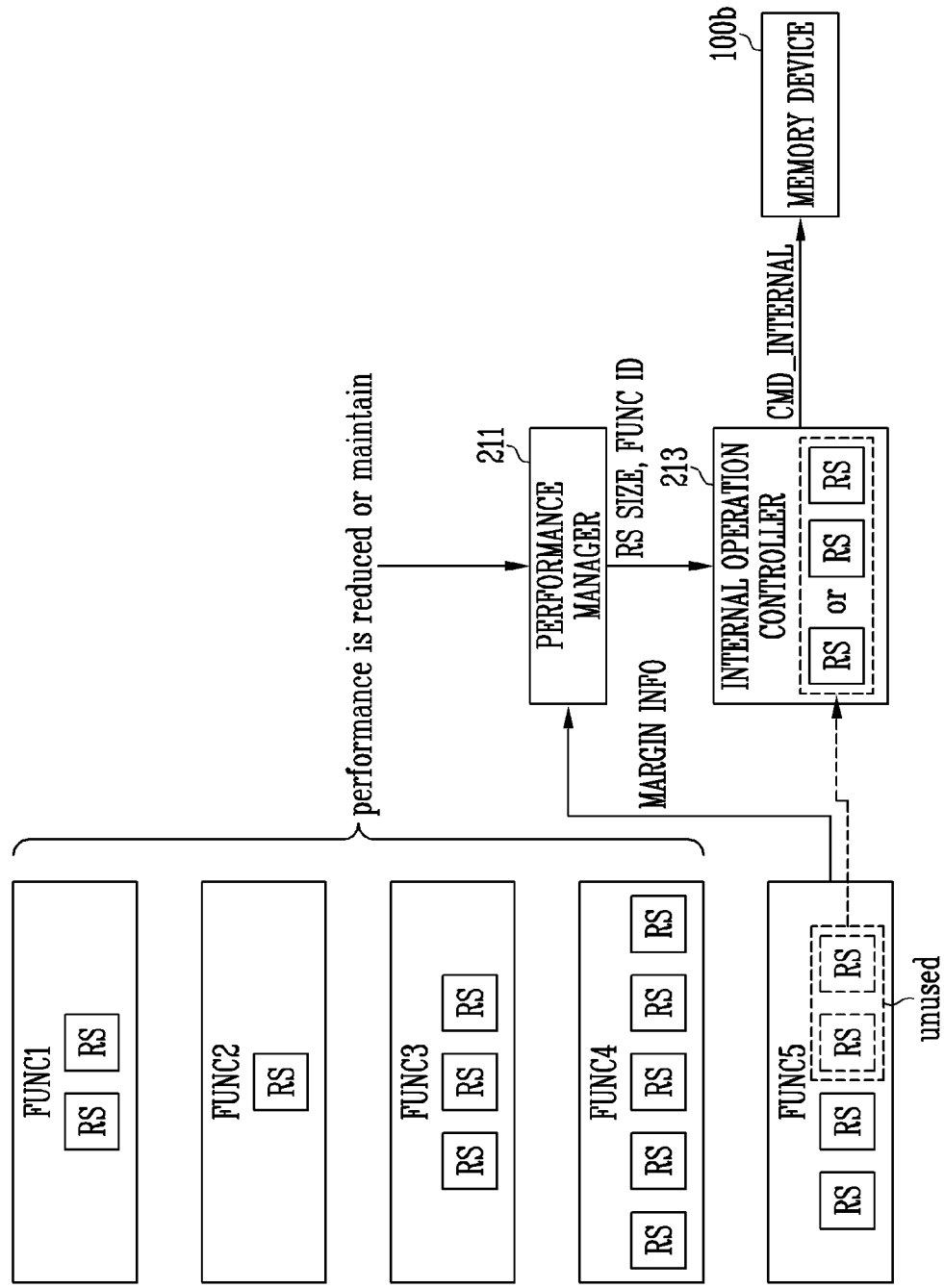
FIG. 8 is a diagram illustrating an example in which an internal operation is controlled based on an embodiment of the disclosed technology.

FIG. 8 is a diagram illustrating an example in which an internal operation is controlled based on an embodiment of the disclosed technology.

Referring to FIG. 8, the plurality of functions FUNC1 to FUNC5 may each control allocated MAs to perform the host-requested operation by using allocated RSs.

The performance manager 211 may periodically check usage status of RSs allocated to the plurality of functions FUNC1 to FUNC5. For example, the performance manager 211 may receive information MARGIN INFO about two idle RSs not used in the host-requested operation from the fifth function FUNC5.

In an embodiment of the disclosed technology, when an internal operation is performed, the internal operation controller 213 may determine the size of the internal operation (e.g., resources allocated to the internal operation) according to the number of idle RSs and control the memory device 100b to perform the internal operation corresponding to the determined size.

In an embodiment of the disclosed technology, the performance manager 211 may determine whether the performance value of the remaining functions is reduced based on a result of comparing a reference performance value of the RSs allocated to the remaining functions with a performance value used by the remaining functions while the internal operation is performed.

For example, the performance manager 211 may determine whether the internal operation influences the performance value of the RSs allocated to the remaining functions FUNC1 to FUNC4 other than the fifth function FUNC5 allocated the idle RSs. The performance manager 211 may calculate a performance value used by the remaining functions FUNC1 to FUNC4 while the internal operation is performed. The performance manager 211 may then compare the reference performance value of the RSs allocated to the remaining functions FUNC1 to FUNC4 with the performance value used by the remaining functions FUNC1 to FUNC4 while the internal operation is performed. The performance manager 211 may determine whether the performance value of the remaining functions FUNC1 to FUNC4 is maintained or reduced, based on a result of the comparing.

In an embodiment of the disclosed technology, the internal operation controller 213 may reduce the number of the idle RSs used for the internal operation when the performance value of the remaining functions other than the target function allocated the idle RSs among the plurality of functions is reduced while the internal operation is performed.

For example, when the performance value of the remaining functions FUNC1 to FUNC4 is reduced, the internal operation controller 213 may reduce the number of the idle RSs used for the internal operation to one. The internal operation controller 213 may control the memory device 100b to perform the internal operation by using the reduced number of idle RSs through the fifth function FUNC5.

On the other hand, when the performance value of the remaining functions FUNC1 to FUNC4 is maintained, the internal operation controller 213 may determine the number of the idle RSs used for the internal operation to be two. The internal operation controller 213 may control the memory device 100b to perform the internal operation by using the two idle RSs determined through the fifth function FUNC5.

Figure 9:
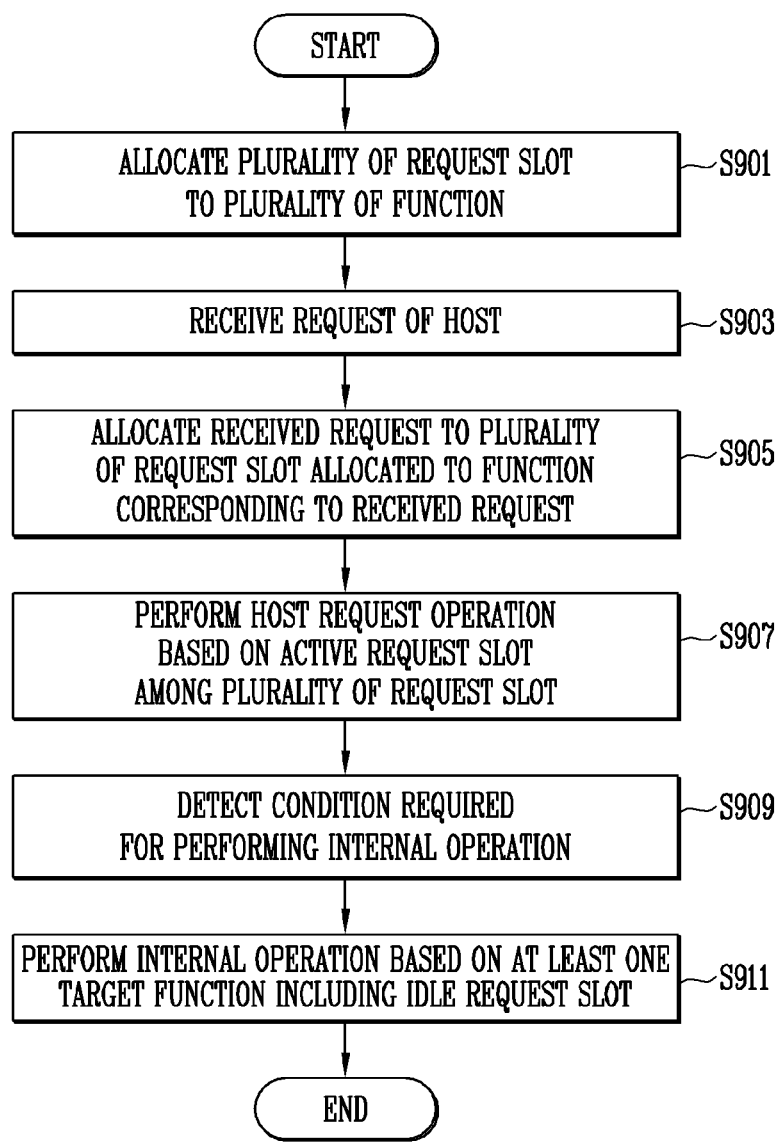
FIG. 9 is a flowchart illustrating a method of operating a storage device based on an embodiment of the disclosed technology.

FIG. 9 is a flowchart illustrating a method of operating a storage device based on an embodiment of the disclosed technology.

The method as illustrated in FIG. 9 may be performed by the storage device 50a as illustrated in FIG. 1 or the storage device 50b as illustrated in FIG. 6. Although it will now be described as being performed by the storage device 50a of FIG. 1, it may be equally applied to the storage device 50b of FIG. 6.

Referring to FIG. 9, at S901, the storage device 50a may allocate a plurality of RSs to a plurality of functions.

For example, the storage device 50a may divide the performance value into a plurality of RSs. The storage device 50a may allocate a plurality of RSs to each of the plurality of functions depending on a size ratio of MAs allocated to each of the plurality of functions among a plurality of MAs included in a plurality of memory devices.

At S903, the storage device 50a may receive a request of the host 300.

At S905, the storage device 50a may allocate the received request to a plurality of RSs allocated to a function corresponding to the received request among the plurality of functions.

At S907, the storage device 50a may perform a host-requested operation based on active RSs among the plurality of RSs.

At S909, the storage device 50a may detect a condition required for performing an internal operation.

At S911, the storage device 50a may perform the internal operation based on at least one target function including idle RSs among the plurality of functions.

In this case, the storage device 50b of FIG. 6 may reduce the number of idle RSs used for the internal operation in response to a performance value used for the host-requested operation reduced while the internal operation is performed.

Furthermore, the storage device 50b of FIG. 6 may perform the internal operation based on the reduced number of idle RSs.

Figure 10:
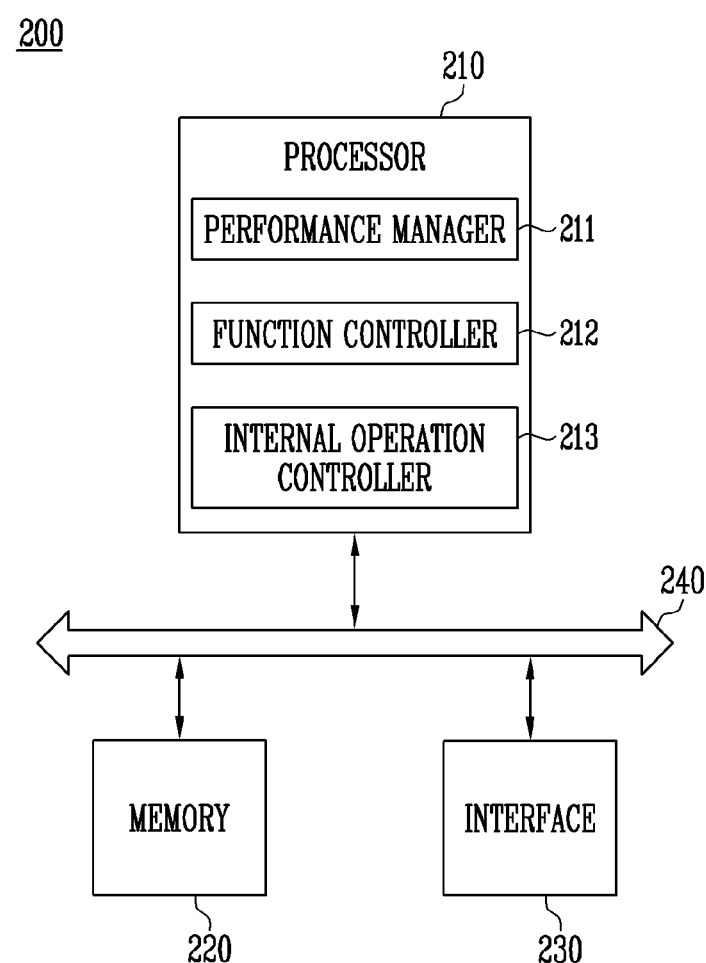
FIG. 10 is a diagram illustrating a memory controller based on an embodiment of the disclosed technology.

FIG. 10 is a diagram illustrating a memory controller based on an embodiment of the disclosed technology.

Referring to the FIG. 10, the memory controller 200 may include a processor 210, a memory 220, an interface 230 and a communication bus 240. The processor 210, the memory 220 and the interface 230 may communicate through the communication bus 240.

The processor 210 may control general operation of the memory controller 200. For example, the processor 210 may execute firmware stored in the memory 220 when power is supplied to the storage device 50a or 50b.

In an embodiment of the disclosed technology, the processor 210 may receive data and a logical block address (LBA) from the host 300, and convert the LBA to a physical block address (PBA) that represents an address of memory cells in which data included in the memory device is to be stored. In this specification, the term LBA may be interchangeably used with a logic address or a logical address. Similarly, the term PBA may be interchangeably used with a physical address.

The performance manager 211, the function controller 212 and the internal operation controller 213 may be implemented in part of the processor 210.

The memory 220 may be used for a buffer memory, cache memory, or operation memory of the memory controller 200. Furthermore, the memory 220 may store various information required for an operation of the memory controller 200 in the form of firmware.

In an embodiment of the disclosed technology, when the memory device 100 is a flash memory device, the firmware (FW) may include a host interface layer (HIL) for controlling communication with the host 300, a flash translation layer (FTL) for controlling communication with the host 300, and a flash interface layer (FIL) for controlling communication with the memory device 100.

The interface 230 may communicate with an external device (e.g., the host 300, an application processor, etc.). The processor 210 may receive a request from the host 300 through the interface 230 and provide a result in response to the request.

Furthermore, the interface 230 may communicate with the memory device 100. The processor 210 may transmit a command, an address and a control signal to the memory device 100 and receive data through the interface 230.

In the meantime, the plurality of functions FUNC1 to FUNCn of FIG. 1 may share resources corresponding to the processor 210, the memory 220 and the interface 230 to be performed in a unit of operation to independently access the MAs.

The resources used by the plurality of functions FUNC1 to FUNCn may be determined depending on size ratios of MAs allocated to the plurality of functions FUNC1 to FUNCn. For example, the size of the resources used by the plurality of functions FUNC1 to FUNCn may be proportional to the number of RSs allocated to the plurality of functions FUNC1 to FUNCn. In an embodiment of the disclosed technology, the resources may include processing resources of the processor 210, the size of the memory 220, a bandwidth of the interface 230, etc.

Figure 11:
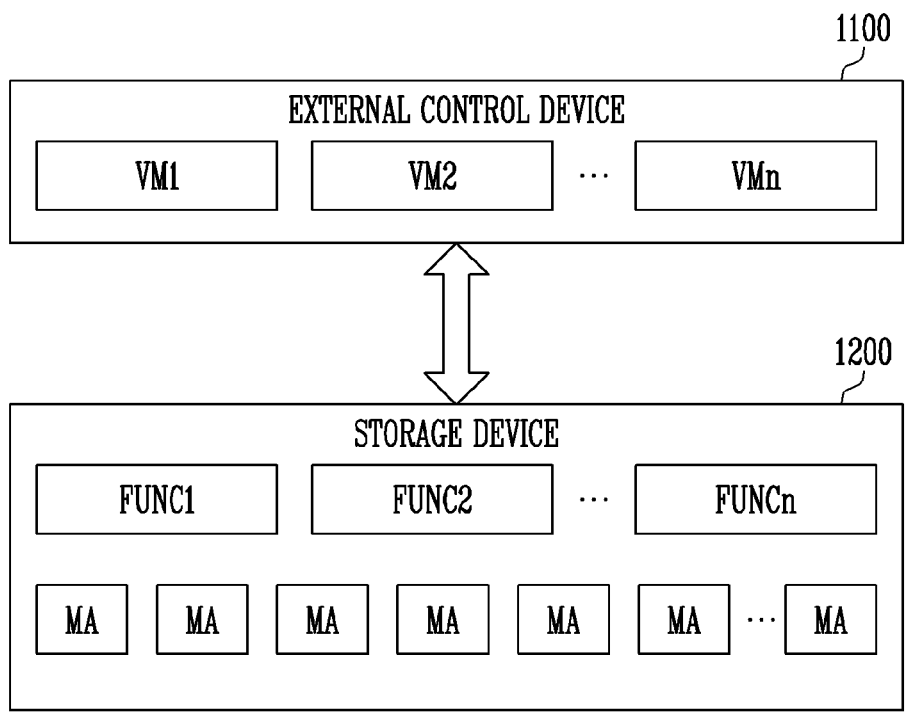
FIG. 11 is a diagram illustrating an example of a computing system based on an embodiment of the disclosed technology.

FIG. 11 is a diagram illustrating an example of a computing system based on an embodiment of the disclosed technology.

Referring to FIG. 11, a computing system 1000 may include an external control device 1100 and a storage device 1200.

The external control device 1100 may be a device for controlling the operation of the storage device 1200.

In an embodiment of the disclosed technology, the external control device 1100 may be a component included in the host 300 of FIG. 1 or FIG. 6 or a separate device present between the host 300 and the storage device 50a or 50b.

In an embodiment of the disclosed technology, the external control device 1100 may include a plurality of virtual machines VM1 to VMn.

In an embodiment of the disclosed technology, the plurality of virtual machines VM1 to VMn may be allocated to the plurality of MAs.

In an embodiment of the disclosed technology, the plurality of virtual machines VM1 to VMn may each provide a request to control an allocated MA among the plurality of MAs to the storage device 1200. For example, the plurality of virtual machines VM1 to VMn may each provide a read request, a write request, an erase request, etc., to the allocated MA.

The storage device 1200 may include a plurality of MAs for storing data.

In an embodiment of the disclosed technology, the storage device 1200 may refer to the storage device 50a of FIG. 1 or 50b of FIG. 6.

In an embodiment of the disclosed technology, the storage device 1200 may include a plurality of functions FUNC1 to FUNCn allocated to the plurality of MAs. Furthermore, the plurality of functions FUNC1 to FUNCn may each receive a request from a virtual machine corresponding to the allocated MA. The plurality of functions FUNC1 to FUNCn may control an allocated MA in response to the received request.

In an embodiment of the disclosed technology, the storage device 1200 may allocate a plurality of reference resources for each of the plurality of MAs. For example, the storage device 1200 may allocate the plurality of reference resources for each of the plurality of functions FUNC1 to FUNCn allocated to the plurality of MAs. The size of the plurality of resources may be proportional to the number of RSs of a function allocated to each MA.

In an embodiment of the disclosed technology, the storage device 1200 may perform an operation corresponding to the request based on first resources among the plurality of reference resources, and perform an internal operation that occurs inside based on the remaining second resources. For example, the storage device 1200 may control the internal operation by using a function allocated the second resources.

In an embodiment of the disclosed technology, the storage device 1200 may determine the number of the plurality of reference resources allocated to each of the plurality of MAs depending on a size ratio of each of the plurality of MAs.

In an embodiment of the disclosed technology, the storage device 1200 may reduce the number of the second resources when the performance value of an operation corresponding to the request which is performed in the plurality of MAs is reduced while the internal operation is performed.

In an embodiment of the disclosed technology, the storage device 1200 may determine whether the performance value of the operation corresponding to the request which is performed in the plurality of MAs is reduced, based on a result of comparing a reference performance value corresponding to the first resources with a performance value corresponding to the first resources while the internal operation is performed.

In an embodiment of the disclosed technology, the storage device 1200 may perform the internal operation by using the reduced number of second resources.

Figure 12:
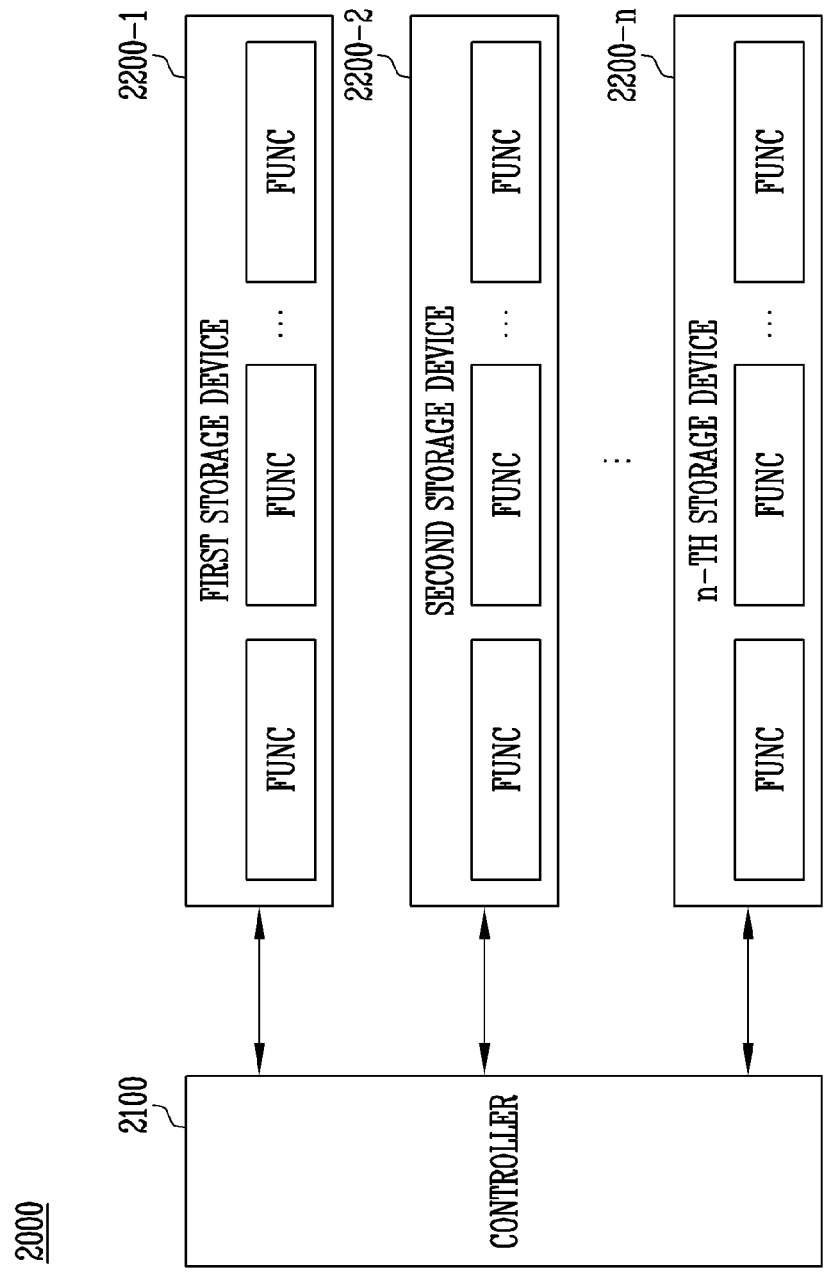
FIG. 12 is a diagram illustrating an example of a computing system based on an embodiment of the disclosed technology.

FIG. 12 is a diagram illustrating an example of a computing system based on an embodiment of the disclosed technology.

Referring to FIG. 12, a computing system 2000 may include a controller 2100 and a plurality of storage devices 2200-1 to 2200-*n*.

The controller 2100 may be a device for controlling operations of the plurality of storage devices 2200-1 to 2200-*n*. The controller 2100 may transmit a request for controlling the plurality of storage devices 2200-1 to 2200-*n* to the plurality of storage devices 2200-1 to 2200-*n*.

In an embodiment of the disclosed technology, the controller 2100 may be a component included in the host 300 of FIG. 1 or FIG. 6 or a separate device present between the host 300 and the storage device 50*a* or 50*b*.

The plurality of storage devices 2200-1 to 2200-*n* may be a device for storing data.

In an embodiment of the disclosed technology, the plurality of storage devices 2200-1 to 2200-*n* may each refer to the storage device 50*a* of FIG. 1 or 50*b* of FIG. 6.

In an embodiment of the disclosed technology, the controller 2100 may allocate the plurality of storage devices 2200-1 to 2200-*n* to a plurality of functions FUNC. The controller 2100 may allocate a plurality of RSs allowed to process or deal with a request per unit time to each of the plurality of functions FUNC. The controller 2100 may determine idle RSs among the plurality of RSs allocated to each of the plurality of functions FUNC. The controller 2100 may control internal operations of the plurality of storage devices 2200-1 to 2200-*n* based on at least one target function FUNC including idle RSs among the plurality of functions FUNC.

In an embodiment of the disclosed technology, the controller 2100 may determine the number of the plurality of RSs allocated to each of the plurality of functions FUNC according to a performance value of each of the plurality of functions FUNC.

In an embodiment of the disclosed technology, the controller 2100 may control the plurality of storage devices 2200-1 to 2200-*n* to perform an operation corresponding to a request by using active RSs.

In an embodiment of the disclosed technology, the controller 2100 may control the plurality of storage devices 2200-1 to 2200-*n* to perform the internal operation by using idle RSs of at least one target function FUNC.

In an embodiment of the disclosed technology, the controller 2100 may determine a size of the internal operation according to the number of the idle RSs of the at least one target function FUNC, and control the internal operation corresponding to the determined size.

As discussed above, the disclosed technology may be implemented in some embodiments to provide a storage device with enhanced operation performance with respect to each function in a multi-function environment, a method of operating the storage device, and a computing system including the storage device.

The embodiments and implementations disclosed above are examples only, and thus various enhancements and variations to the disclosed embodiments and implementations and other embodiments and implementations can be made based on what is described and illustrated in this patent document.

What is claimed is:

1. A storage device, comprising:
a plurality of memory devices; and
a memory controller in communication with the plurality of memory devices to control the plurality of memory devices in processing a request of a host device that is in communication with the storage device to access data stored in the plurality of memory devices,
wherein the memory controller is configured to:
allocate the plurality of memory devices to a plurality of functions;
allocate a plurality of request slots corresponding to at least part of the plurality of memory devices available for dealing with the request of the host device per unit time to each of the plurality of functions;
determine idle request slots other than active request slots that are being used for processing the request of the host device, among the plurality of request slots allocated to each of the plurality of functions; and
control an internal operation of the plurality of memory devices based on at least one target function associated with the idle request slots, among the plurality of functions.

2. The storage device according to claim 1, wherein the memory controller is configured to determine a number of the plurality of request slots allocated to each of the plurality of functions according to a performance value of each of the plurality of functions.

3. The storage device according to claim 1, wherein the memory controller is configured to determine a number of the active request slots according to a number of the requests.

4. The storage device according to claim 3, wherein the plurality of functions is configured to control the plurality of memory devices to perform a host-requested operation corresponding to the request by using the determined number of the active request slots.

5. The storage device according to claim 1, wherein the memory controller is configured to control the plurality of memory devices to perform the internal operation by using the idle request slots of the at least one target function.

6. The storage device according to claim 1, wherein the memory controller is configured to determine a size of the internal operation according to a number of the idle request slots of the at least one target function, and control the internal operation corresponding to the determined size of the internal operation.

7. The storage device according to claim 1, wherein the memory controller is configured to perform the internal operation on at least one of the plurality of memory devices.

8. The storage device according to claim 1, wherein the internal operation comprises at least one of a garbage collection operation, a read reclaim operation, or a wear leveling operation.

9. A storage device, comprising:
a memory device including a plurality of memory areas; and
a memory controller in communication with the plurality of memory devices to control the memory device in processing a request of a host device in accessing the plurality of memory devices,
wherein the memory controller is configured to:
allocate the plurality of memory areas to a plurality of functions;
allocate a plurality of request slots corresponding to at least part of the plurality of memory areas available for dealing with the request of the host device per unit time to each of the plurality of functions, determine idle request slots other than active request slots that are being used to process the request of the host device among the plurality of request slots allocated to each of the plurality of functions; and control an internal operation of the memory device based on at least one target function associated with the idle request slots, among the plurality of functions.

10. The storage device according to claim 9, wherein the memory controller is configured to control the memory device to perform the internal operation by using the idle request slots associated with the at least one target function upon determining that the internal operation is required to be performed.

11. The storage device according to claim 9, wherein the memory controller is configured to reduce a number of the idle request slots of the at least one target function in response to a decrease in a performance value of the plurality of functions while the internal operation is being performed.

12. The storage device according to claim 11, wherein the memory controller is configured to determine whether there is the decrease in the performance value of the plurality of functions by comparing a reference performance value of the active request slots with a performance value used by the active request slots while the internal operation is being performed.

13. The storage device according to claim 11, wherein the memory controller is configured to control the memory device to perform the internal operation by using the reduced number of idle request slots of the at least one target function.

14. A method of operating a storage device, the method comprising:

allocating a plurality of request slots corresponding to at least part of memory resources in the storage device, to a plurality of functions;

receiving a request of a host device;

allocating the received request to the plurality of request slots allocated to a function of the plurality of functions corresponding to the received request;

performing a host-requested operation corresponding to the received request based on active request slots allocated the received request;

detecting a condition for performing an internal operation; and performing the internal operation based on at least one target function associated with idle request slots to which the received request is not allocated, among the plurality of functions.

15. The method according to claim 14, wherein allocating the plurality of request slots to a plurality of functions comprises:

dividing a whole performance value of the storage device into the plurality of request slots; and allocating the plurality of request slots to the plurality of functions depending on a size ratio of memory areas allocated to each of the plurality of functions among a plurality of memory areas.

16. The method according to claim 14, wherein performing the host-requested operation comprises:

determining a number of the active request slots in response to the request; and performing the host-requested operation by using the determined number of active request slots.

17. The method according to claim 14, wherein performing the internal operation comprises:

in response to a decrease in a performance value used by the host-requested operation while the internal operation is performed, reducing a number of the idle request slots of the at least one target function; and performing the internal operation based on the reduced number of idle request slots of the at least one target function.

* * * * *